June 4, 1957 G. B. WORTHEN 2,794,913

FACSIMILE RECORDING AMPLIFIER

Original Filed Nov. 16, 1948 3 Sheets-Sheet 1

INVENTOR.
G. B. WORTHEN

BY Edward R. Hyde Jr.

ATTORNEY

June 4, 1957 G. B. WORTHEN 2,794,913

FACSIMILE RECORDING AMPLIFIER

Original Filed Nov. 16, 1948 3 Sheets-Sheet 2

INVENTOR.
G. B. WORTHEN
BY Edward R. Hyde Jr.
ATTORNEY

INVENTOR.
G. B. WORTHEN
BY Edward R. Hyde Jr.
ATTORNEY 2,794,913
Patented June 4, 1957

2,794,913

FACSIMILE RECORDING AMPLIFIER

George B. Worthen, New York, N. Y., assignor to The Western Union Telegraph Company, New York, N. Y., a corporation of New York Original application November 16, 1948, Serial No. 60,334. Divided and this application January 8, 1953, Serial No. 330,341

2 Claims. (Cl. 250—27)

This invention relates to the art of amplifying received radio signals and more particularly to an amplifier for a facsimile recorder.

This application is a division of applicant's copending application Serial No. 60,334, filed November 16, 1948, now Patent No. 2,647,945. The latter application discloses a facsimile system including a portable transmitter communicating with a distant recorder. The instant invention is concerned with the novel recording amplifier, and only so much of the system disclosed in the parent application as is necessary for an understanding of the present invention is herein disclosed.

In the recording of facsimile messages there are no intermediate intelligence signals. The recorder is concerned only with black and white indications, that is, signal and no signal conditions. However, for good reproduction of the transmitted message, each signal must be approximately equal in energy content, in order to reproduce spots of constant density. Also, the rejection of noise signals during a no signal interval is highly desirable to avoid recording a spot where a white area should appear.

Accordingly, applicant has devised a facsimile recording amplifier with the primary objective of reshaping both strong and weak input signals into substantially uniform waves for recording.

A further object of this invention is to provide a recording amplifier that will reject substantially all intermediate noise signals.

Figure 1:
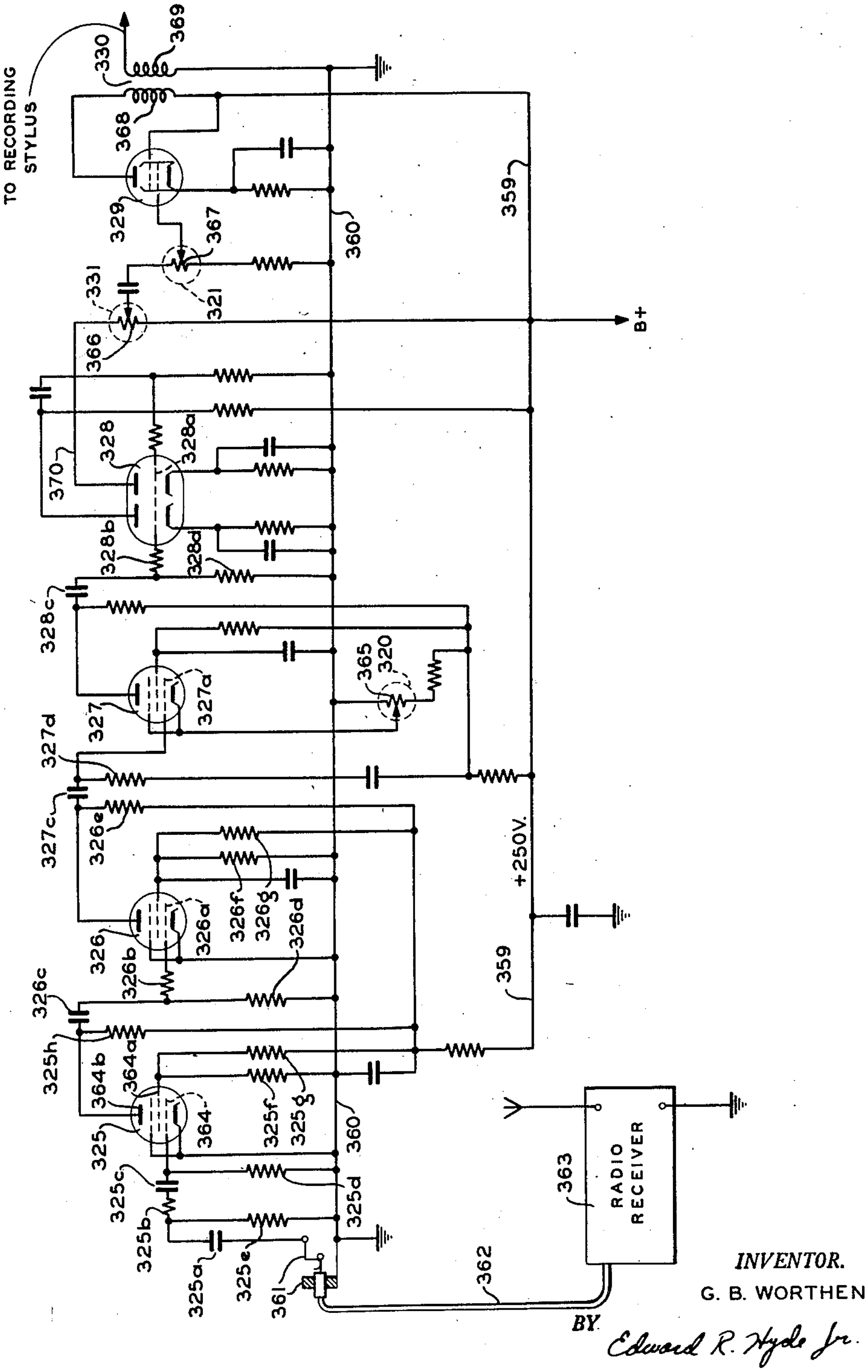
Figure 2:
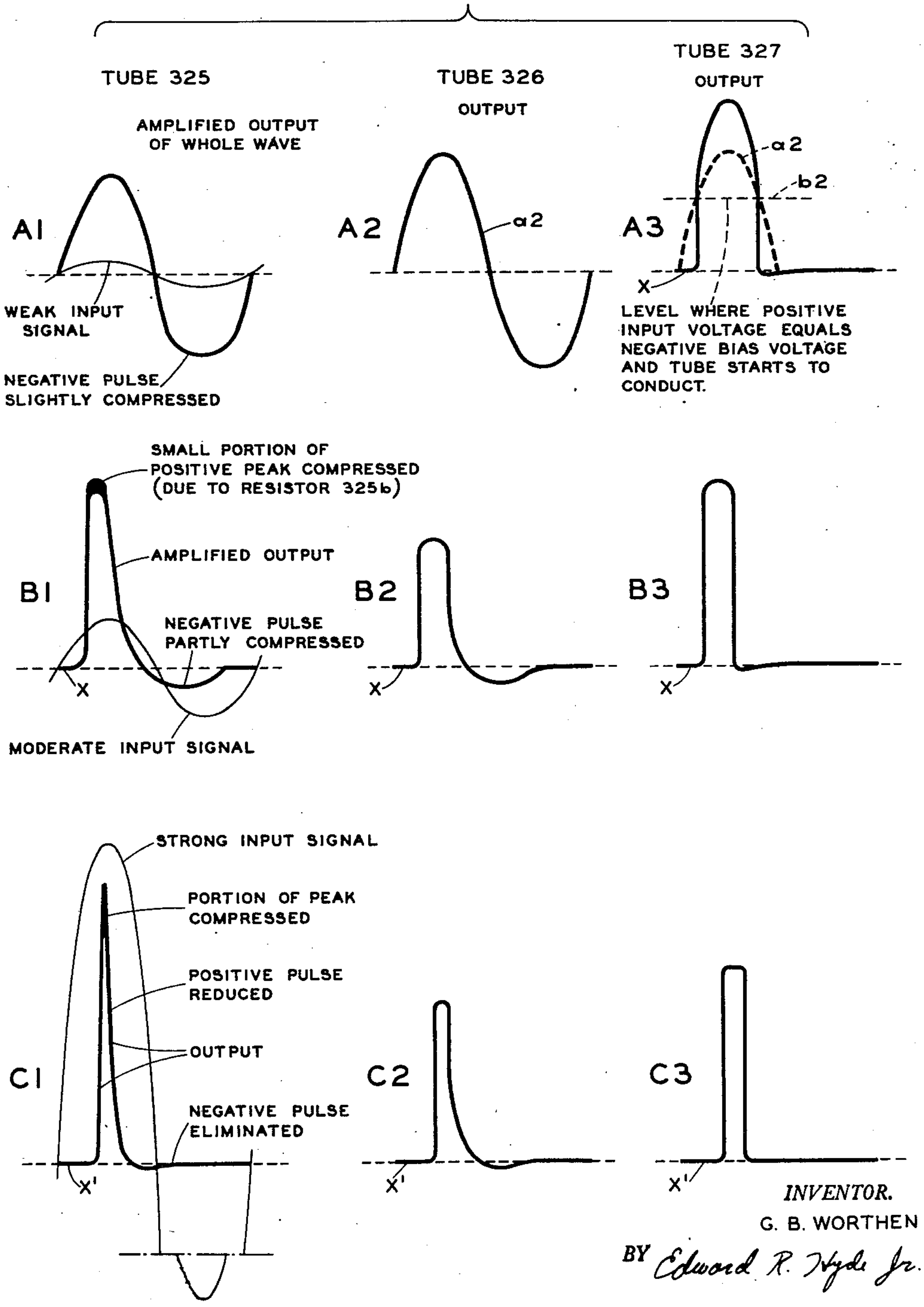
Figure 3:
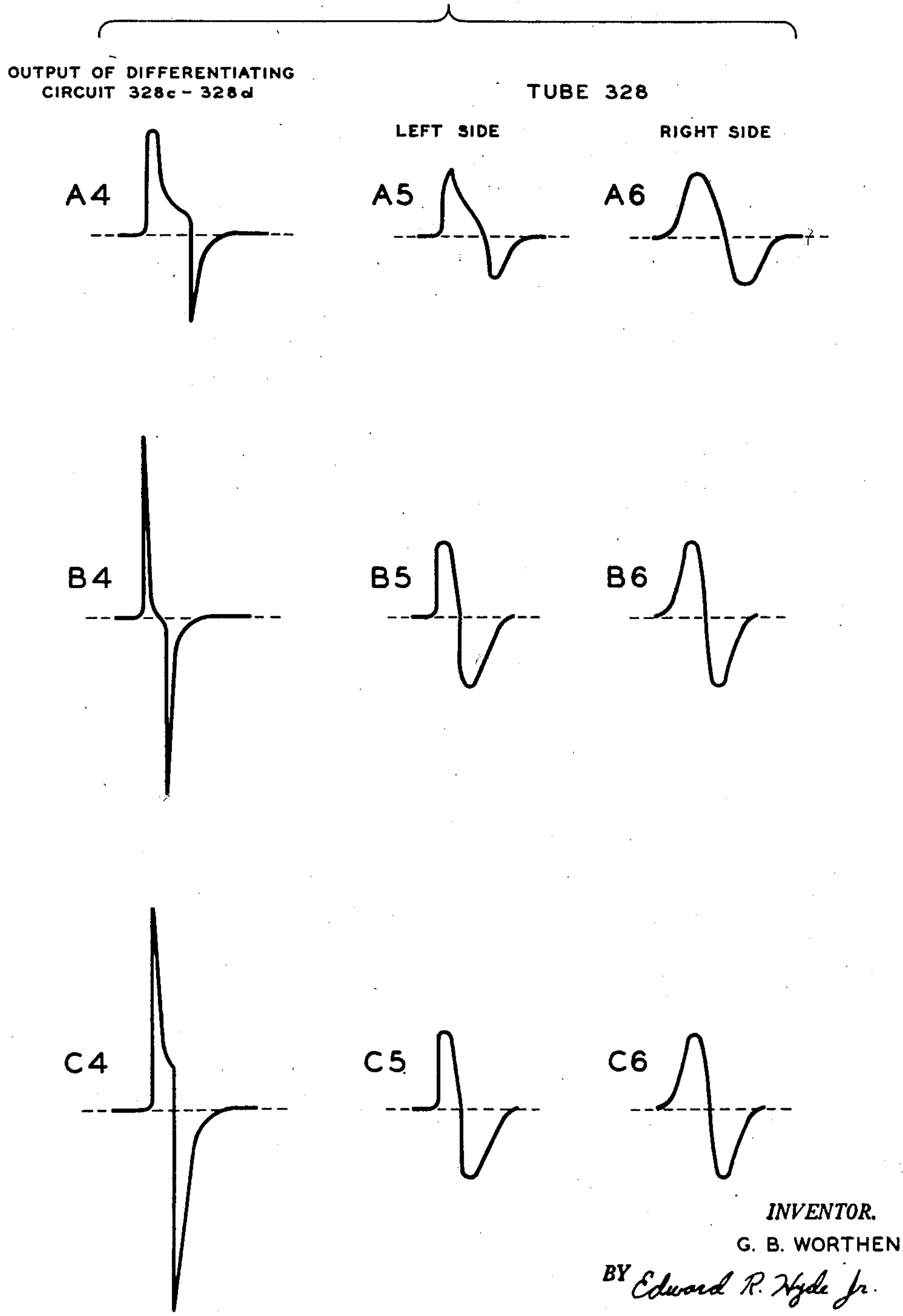

The invention will be more fully understood by reference to the following description taken with the drawings in which:

Fig. 1 is a diagram of the recording amplifier;

Figs. 2 and 3 consist of wave diagrams which indicate roughly the progress of signal waves of different levels through the recording amplifier.

To facilitate reference to the above-cited parent application, the various elements of the drawings are given the same reference numerals.

The recording amplifier utilizes five vacuum tubes numbered 325 to 329. The characteristics and interstage connections of these tubes are such that the amplifier not only amplifies the received signals but also performs the automatic functions of power level control, noise rejection, signal wave shaping and the uniform limiting of signal output with a wide variation of input level. The first three tubes 325, 326, 327 are pentodes with a novel form of coupling and operation to be presently described. Tubes 325 and 326 have a remote cut-off, while tube 327 has a sharp cut-off. The fourth tube 328 of the amplifier is a dual triode which operates as a limiter and wave shaper of signals over a wide range of input level and frequencies. The final tube 329 is a beam-power tube connected to the output transformer 330 which supplies the recording voltages to the stylus. The plate circuits of all the tubes 325 to 329 are connected to the 250 volt D. C. line 359. The conductor 360 represents the common ground of the tubes.

At the input end of the recording amplifier is a jack 361 into which is plugged the shielded output cable 362 of a portable radio receiver 363. The spring contact of jack 361 is connected to the control grid 364 of tube 325, which is therefore operated by the input voltages picked up by the radio receiver. These voltages comprise not only the facsimile signal voltages sent out by a radio transmitter but also the lower noise voltages which modify the signal wave. The circuit connections between jack 361 and the control grid 364 include a D. C. blocking condenser *325a*, a resistor *352b*, a grid bias condenser *325c*, and a high resistor *325d* which controls the discharging time of the bias condenser. A load resistor *325e* constitutes the input impedance of the amplifier.

Resistors *325f* and *325g* determine the value of the voltage impressed on the screen grid *364a* of tube 325 from the supply conductor 359 which in this case is at +250 volts and which also supplies power to the plate *364b* of the tube across a resistor *325h*. It is important to point out that in this particular application of tube 325 the voltage on screen grid *364a* is of low value as compared with the plate voltage. For example, in the present embodiment of our invention the resistors *325f* and *325g* are of such values as to fix the voltage on screen grid *364a* at 1 or 2 volts positive. This low screen voltage and the value of resistor *325h* are the chief factors that so determine or adjust the operating characteristics of tube 325 as to make its cut-off more gradual and therefore cause the recording amplifier to work with a wide variation of input signal strength.

As described in the cited parent application, a phasing pulse is sent out by a radio transmitter at each revolution of a scanning drum and a signal pulse is transmitted every time a stylus scans a black mark on the message copy. Each phasing pulse and scanning signal picked up by the radio receiver 363 charges the condenser *325c* across the low resistor *325b* very rapidly to the maximum amount for the particular signal level of the moment. This condenser charge is impressed on the control grid 364 of tube 325 as a negative bias which determines the amplification of the tube.

On weak signals the charge on condenser *325c* is small and therefore the negative bias on grid 364 is low, whereby the amplification of tube 325 is correspondingly high. When strong signals are received, the charge on condenser *325c* is high and the resulting high negative grid bias keeps the amplification of the tube down. In consequence, the tube 325 amplifies weak signals to a greater degree than strong signals, so that the output of the tube is fairly constant for a wide variation of signal input. For weak signals the tube 325 amplifies the whole wave, with the negative pulse slightly compressed. For moderate and strong signals the tube 325 compresses progressively more of the negative pulses with increasing signal strength. This action of tube 325 on weak, moderate and strong signals is illustrated in diagrams A1, B1 and C1 of Fig. 2.

While the charging time of the grid bias condenser *325c* is very short, the rate of discharge is comparatively low due to the high value of resistor *325d*. In the present form of our system as herein set forth, the charging time of condenser *325c* is less than the duration of a phasing pulse sent out by the transmitter, and the discharging time endures for at least one revolution of the transmitter drum (that is, for one scanning line). For this purpose we use a condenser of large capacity (say, 0.1 mfd.) and make the resistor *325d* of high value (say, 10 megohms). These figures are mentioned merely by way of example.

With the charging time of condenser *325c* less than the duration of a phasing pulse, it is certain that the condenser charge will always reach full value during a phasing pulse at any signal level. In this case it is necessary to make the discharging time of condenser 325c cover at least one turn of the transmitter drum for the following reason: As we have seen, a phasing pulse is sent to the recorder once for each revolution of the transmitter drum for a brief duration of time and this pulse places a negative bias voltage on grid 364 of tube 325. Now, if for the remainder of a scanned line no black marks are encountered by the stylus, there is an absence of signals and (without special provisions) the bias voltage on grid 364 would decrease, the amplification of tube 325 would increase, and any noise present would be passed on for recording. To prevent this from happening we make the discharge time of condenser 325c long enough to keep sufficient negative bias on grid 364 for one scanning line, so that the amplification of tube 325 is held down to a point where noise signals will not pass.

The elements 325b, 325c and 325d constitute a grid leak combination which determines the bias on grid 364 of tube 325. Since this tube is of the remote cut-off type, its amplification varies with the effective grid bias, which in turn varies with the strength of the input signals. The time constant of the grid leak combination 325b—325c—325d is such that the bias on grid 364 when once established decreases rather slowly but increases rapidly. As the signal increases, the current flowing to the grid 364 increases correspondingly and thus charges the condenser 325c, so that a negative bias is applied to the grid by the voltage drop across the resistor 325d.

The operating characteristics of tube 325 (as determined by the slope of its transfer characteristic curve) are such that strong or large signals are amplified proportionately less than weak signals. As indicated in diagram B1 and C1 of Fig. 2, the positive peaks of increasing signals are compressed by the resistor 325b which acts as a limiter to dissipate excess voltage and thereby prevent severe noises from varying the signal output of tube 325. The resistor 325b performs the additional function of slowing down the charging time of condenser 325c. This prevents sudden strong bursts of local static from interfering with the passage of normal signals which will record as soon as the D. C. bias applied momentarily to condenser 325c by the static burst has drained off.

It is a characteristic of tube 325 that it operates with a signal rejection rate which increases with increase of signal. This is indicated in diagrams B1 and C1 of Fig. 2 by the horizontal lines *x* and *x'* which represent each the time interval between the beginning of a cycle and the instant when plate current flows through the tube. For all but the weaker signals, tube 325 rejects the incoming wave until the signal voltage rises to a point where the plate draws current. That is to say, the tube 325 rejects any signal voltage lower than the grid bias voltage and the interval during which the signal voltage rises to the level of the bias voltage is represented by the lines *x* and *x'* in the wave diagrams. For the purpose of description we may regard the lengths of lines *x* and *x'* which increase with the rise in signal level, as denoting roughly the signal rejection characteristics of tube 325.

The output of tube 325 is passed to the second tube 326, which operates as a limiter for all but the weakest signals which are slightly amplified. The tube 326 operates with a low negative bias (say, minus 0.5 volt) and with very low plate and screen voltages. The plate voltage (6 to 8 volts positive) is determined by the value of resistor 326e and the screen voltage is determined by the voltage divider consisting of resistors 326f and 326g, these figures being given merely as practical examples. The signals coming from tube 325 charge the condenser 326c which applies a negative bias to the control grid 326a across a resistor 326b. The condenser 326c is connected in series with a resistor 326d to form a grid limiting circuit which has a much more rapid time constant than the grid leak circuit of tube 325. Consequently the tube 326 passes on the more positive portion of the signal wave while rejecting the negative portion. As the signals entering tube 326 increase in level, they are increasingly more limited because of the value of resistor 326b and the characteristics of the tube. The effect of tube 326 on weak, moderate and strong signals is illustrated in diagrams A2, B2 and C2 of Fig. 2.

The characteristics of tube 326 include the function of decreasing the signal rejection rate with increasing signal level. This, it will be noted, is the reverse of the rejection characteristic of tube 325. That is to say, while tube 325 has a rejection rate which increases with increasing signal level, the second tube 326 operates with a rejection rate which decreases with increase of signal. The result of this automatic compensation feature is a more nearly constant ratio of signal passed to signal rejected.

The output of tube 326 goes into the third tube 327, which is of the sharp cut-off type and operates with a fixed cut-off bias which is adjustable to the proper value by a potentiometer 365 to remove the residual noise from the input signals. The potentiometer 365 is regulated by a fingerpiece 320 on the control panel. A condenser 327c and resistor 327d form a conventional interstage coupling for the grid 327a, but the time constant of 327c—327d is very short as compared with that of 325b—325c—325d.

The tube 327, which operates beyond cut-off, passes only those signals that are above the minimum voltage determined by the grid bias setting of potentiometer 365. This will be understood from diagram A3 of Fig. 2. where the input wave coming from tube 326 is indicated by *a2* and the fixed negative bias of tube 327 is denoted by the line *b2*. The tube 327 does not start to conduct until the wave *a2* reaches the bias level *b2* after an interval measured by the line *x*, the meaning of which was previously explained in connection with tube 325. In other words, the third tube 327 passes only those portions of the signal wave which are positive beyond the fixed negative bias on grid 327a and those passed-on portions of the signal wave are positive pulses of approximately rectangular wave shape. The negative pulses of the signal waves, it will be recalled, are eliminated in tubes 325 and 326. Therefore, what we are passing through the third tube 327 are positive signal pulses of approximately rectangular shape, free of all deleterious noise and substantially uniform, as indicated in the wave diagrams A3, B3 and C3 of Fig. 2.

The fourth tube 328 is a double triode used as a grid-limiting over-driven amplifier to limit the higher signals passed by the third tube 327 in excess of the minimum signals. The tube 328 receives the rectangular signal impulses from tube 327 through a differentiating network composed of a condenser 328c and a resistor 328d, which changes the rectangular positive wave into sharp positive and negative pulses by the charging and discharging of the condenser. This will be understood by electrical engineers without further explanation and we need only refer to diagrams A4, B4 and C4 of Fig. 3 as illustrating the approximate shape of the differentiated wave before passing into the tube 328. The condenser charge flows to the grid 328a through a resistor 328b which limits the peaks of these positive and negative pulses so that they are shaped into a more uniform A. C. wave. The output of the left side of tube 328 is indicated by the diagrams A5, B5 and C5, and the output of the right side of tube 328 (that is, the final output of this tube) is indicated by the diagrams A6, B6 and C6.

Comparing the widely varying signal input of the first tube 325 with the output of the fourth tube 328 (diagrams A6—B6—C6) we see the efficient operation of the amplifier in converting transmitted signals, fluctuating over a wide range, into recording signals of relatively uniform energy content. The final output of limiter tube 328 passes through a voltage divider network which contains a gain control 366 and a record level control 367 for the final tube 329. The gain control 366 is a potentiometer adjusted at the factory by means of the dial 331 mounted on the base of the receiver. The record level control 367 is a potentiometer regulated by the fingerpiece 321 on the control panel to effect a vernier adjustment of the gain required by any particular machine.

The final tube 329 of the recording amplifier is a conventional beam-power tube which amplifies the received signals to the required strength. The output of tube 329 is a fairly constant A. C. voltage which goes into the primary coil 368 of transformer 330. The recording voltage induced in the secondary coil 369 of this transformer is impressed on a recording stylus which produces marks on electrosensitive paper in a manner well understood by facsimile engineers.

It will be apparent from the foregoing description that the present facsimile recording amplifier differs materially in construction and operation from prior amplifiers used in radio receiver circuits for automatic volume control. As is well known, in radio receivers it is necessary to maintain distortion at a minimum and that limits the range of satisfactory operation of the receiver. Furthermore the output of radio receivers actually increases with an increase of input signal, although the rate of such increase is somewhat cut down by automatic volume control.

This novel recording amplifier is concerned only with black and white signals (that is, with signal and no-signal), intermediate tones not being important. Therefore the amplifier had to be designed in such a way as to maintain the energy content of the output recording signals relatively constant over a wide range in input level. In other words, distortion of the signal wave shape in this equipment is unimportant as long as the black marks are recorded with approximately constant density for weak and strong signals. To cite specific figures by way of illustration, the particular form of recording amplifier herein disclosed was designed to operate with a signal input variation of 45 decibels and the values of the condensers and resistors used in the tube circuits were so chosen that a change of at least 40 decibels in the input level will produce a change in the recording level of less than 2 decibels. Such a small reduction of voltage on the recording stylus will not appreciably lessen the black density of the recorded mark. As a result, weak signals passing through the amplifier are recorded with practically the same density as strong signals.

The time constants of the interstage couplings containing the condensers **326*c*, 327*c* and 328*c*** have large values so that the low frequency components of signals pass readily through the amplifier, which operates on frequencies of wide audio range (for example, between 1000 and 4000 cycles per second). With respect to the noise removing function of our amplifier, the circuits are so designed that noise of less than half a signal amplitude will not appreciably detract from the recorded copy.

In describing the operation of the recording amplifier reference has been made to signals of different strengths or levels as weak, moderate and strong. It is realized that these terms are merely relative and it would be impossible to give any set of accurate figures applicable to every embodiment of the invention. However, there can be given a fairly good idea of what is regarded as weak, moderate and strong signals by considering what was actually done in the particular apparatus herein described as illustrative of the invention. The amplifier is so designed that the minimum input voltage on which it will operate satisfactorily is of the order of 0.2 volt, and it was assumed that the maximum signal voltage received would be about 40 volts. Weak signals may be said to be those of such low voltage (in this case, up to 0.5 volt) that the first tube 325 passes both the positive and negative pulses, although a portion of the negative pulses may be compressed. Those signals in which the tube 325 clips off a portion of the positive peak and eliminates a part of the negative pulse, are referred to as moderate signals which vary, let us say, between 0.5 and 5.0 volts. Signals of higher voltage may be designated as strong or large signals for the purposes of this specification. It goes without saying that the above figures are put forth merely as examples and do not imply any restriction on the scope of the invention. As for the wave diagrams of Figs. 2 and 3, it will be understood that these are not of mathematical accuracy and were drawn as rough approximations of changes in the signal waves as they pass from one tube to the next in the recording amplifier.

Further, it is evident that various modifications of the disclosed embodiment of the invention could be made without departing from the scope and spirit of the appended claims.

What is claimed is:

1. In a facsimile telegraph system employing periodic phasing pulses, a recording amplifier comprising first tube means having a control grid, screen grid and suppressor grid, first circuit means to apply received signals to said first tube means, said first circuit means including a series combination of a blocking capacitor, input resistor and grid bias capacitor connected to said control grid, a load resistor connected between ground and the junction of said blocking capacitor and input resistor, a grid leak resistor connected to ground and to said control grid whereby weak signals will apply a low negative bias on the first tube means resulting in high gain and strong signals will apply a high negative bias on the tube means resulting in low gain, said input resistor having a low value of resistance relative to a high resistance value of said grid leak resistor whereby the grid bias capacitor will be fully charged during the interval of each phasing pulse and the discharge time of the capacitor is at least equal to the period between successive phasing pulses, second tube means having a control grid, screen grid and suppressor grid, second circuit means connecting the output of the first tube means to the input of the second tube means, said second circuit means including a series combination of a second capacitor and second resistor connected between the plate of the first tube means and ground, third resistor connected to the junction of said second resistor and the second capacitor and connected to the control grid of said second tube means, third tube means having a control grid, screen grid and suppressor grid, third circuit means interconnecting the plate of said second tube means and the control grid of the third tube means, said third tube means having biasing means including a potentiometer set to bias the third tube means beyond cut-off whereby only those portions of a signal more positive than a predetermined amount will pass, a differentiating network connected to the plate of said third tube means and ground, fourth tube means comprising a double triode, resistor means connecting said differentiating network to the input of said fourth tube means, said fourth tube means operating as a grid-limiting amplifier whereby the positive and negative pulses are shaped into uniform A. C. waves.

2. In a facsimile telegraph system employing periodic phasing pulses, a recording amplifier comprising first tube means having a control grid, screen grid and suppressor grid, first circuit means to apply received signals to said first tube means, said first circuit means including a series combination of a blocking capacitor, input resistor and grid bias capacitor connected to said control grid, a load resistor connected between ground and the junction of said blocking capacitor and input resistor, a grid leak resistor connected to ground and to said control grid whereby weak signals will apply a low negative bias on the first tube means resulting in high gain and strong signals will apply a high negative bias on the tube means resulting in low gain, said input resistor having a low value of resistance relative to a high resistance value of said grid leak resistor whereby the grid bias capacitor will be fully charged during the interval of each phasing pulse and the discharge time of the capacitor is at least equal to the period between successive phasing pulses, second tube means having a control grid, second circuit means connecting the output of the first tube means to the input of the second tube means, said second circuit means including a series combination of a second capacitor and second resistor connected between the plate of the first tube means and ground, a third resistor connected to the junction of said second resistor and the second capacitor and connected to the control grid of said second tube means, third tube means having a control grid, third circuit means interconnecting the plate of the second tube means and the control grid of the third tube means, said third tube means having biasing means including a potentiometer set to bias the third tube means beyond cutoff whereby only those portions of a signal more positive than a predetermined amount will pass, a differentiating net work connected to the plate of said third tube means and ground, fourth tube means comprising a double triode, resistor means connecting said differentiating network to the input of said fourth tube means, said fourth tube means operating as a grid-limiting amplifier whereby the positive and negative pulses are shaped into uniform A. C. waves.

References Cited in the file of this patent

UNITED STATES PATENTS

| | | |
|---|---|---|
| 2,113,214 | Luck | Apr. 5, 1938 |
| 2,176,663 | Browne et al. | Oct. 17, 1939 |
| 2,265,689 | Dome | Dec. 9, 1941 |
| 2,289,840 | Herz | July 14, 1942 |
| 2,298,657 | Smith et al. | Oct. 13, 1942 |
| 2,305,842 | Case | Dec. 22, 1942 |
| 2,423,671 | Wolff | July 8, 1947 |
| 2,615,943 | Gouriet et al. | Oct. 28, 1952 |